United States Patent
Li et al.

(10) Patent No.: US 10,187,315 B2
(45) Date of Patent: Jan. 22, 2019

(54) APPARATUS AND METHOD FOR OPTIMIZING COMMUNICATIONS AT AN INTERMITTENT COMMUNICATION LINK

(75) Inventors: Li Li, Los Altos, CA (US); Ben-Heng Juang, Milpitas, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 733 days.

(21) Appl. No.: 13/605,680

(22) Filed: Sep. 6, 2012

(65) Prior Publication Data

US 2014/0064095 A1    Mar. 6, 2014

(51) Int. Cl.
| | | |
|---|---|---|
| *H04L 12/24* | (2006.01) | |
| *H04L 12/823* | (2013.01) | |
| *H04L 29/06* | (2006.01) | |
| *H04W 80/06* | (2009.01) | |

(52) U.S. Cl.
CPC ............ *H04L 47/32* (2013.01); *H04L 69/163* (2013.01); *H04W 80/06* (2013.01)

(58) Field of Classification Search
CPC ......... H04L 47/32; H04L 69/28; H04W 80/06
USPC ........................................ 370/236, 238, 230
See application file for complete search history.

(56) References Cited

U.S. PATENT DOCUMENTS

| | | | | |
|---|---|---|---|---|
| 7,733,774 B1 * | 6/2010 | Sasidharan et al. | ........... | 370/230 |
| 2002/0010783 A1 * | 1/2002 | Primak | .................. | G06F 9/505 709/228 |
| 2006/0039287 A1 * | 2/2006 | Hasegawa et al. | ........... | 370/238 |
| 2007/0022195 A1 * | 1/2007 | Kawano | .................. | H04L 43/16 709/225 |
| 2007/0297410 A1 * | 12/2007 | Yoon et al. | ..................... | 370/392 |
| 2010/0309783 A1 * | 12/2010 | Howe | ........................... | 370/230 |
| 2011/0131646 A1 * | 6/2011 | Park | ..................... | H04L 63/1458 726/13 |
| 2011/0207485 A1 * | 8/2011 | Dimou | .............. | H04W 36/0055 455/507 |
| 2011/0310901 A1 * | 12/2011 | Uchida et al. | ................ | 370/392 |
| 2013/0064179 A1 * | 3/2013 | Attar | ..................... | H04L 47/323 370/328 |

* cited by examiner

*Primary Examiner* — Romani Ohri
(74) *Attorney, Agent, or Firm* — Sterne, Kessler, Goldstein & Fox P.L.L.C.

(57) ABSTRACT

Apparatus and methods for optimizing communications at a communication processor that exchanges communications across a communication link on behalf of an application processor or other local endstation of the communications, wherein the communication link is intermittently inoperative. The application processor is a source or destination of communication packets that traverse the link, while the communication processor transmits and receives the packets for the application processor. Packets are queued at the communication processor for transmit while the link is temporarily inoperative. A filter operates to select obsolete packets for discard. Obsolete packets may include packets for which a subsequent FIN packet (or other termination notice) is received, and may also include packets that have associated deadlines that expire or that will expire before they can be delivered. Obsolete packets may further include packets that have been retransmitted while the link is inoperative.

20 Claims, 2 Drawing Sheets

APPARATUS AND METHOD FOR OPTIMIZING COMMUNICATIONS AT AN INTERMITTENT COMMUNICATION LINK

BACKGROUND

This invention relates to the field of data communications. More particularly, apparatus and methods are provided for optimizing communications at a data transceiver that exchanges communications across a communication link that is intermittently inoperative or disabled.

Communication connections, especially wireless connections, can be plagued by intermittent outages caused by environmental conditions, loss of power, interference, hardware failure and other factors. Besides affecting communication throughput, such outages may cause or exacerbate congestion at a station that cannot transmit during the outages.

For example, when a TCP (Transport Control Protocol) connection or flow between a source and a destination is interrupted, a timer may activate and cause retransmission of packets that were not acknowledged in a timely manner. However, the original packets may be buffered at an intermediate location, such as a transmitter that forwards the source's packets toward the destination.

Because the intermediate entity is not an endstation of the interrupted communication connection, it will simply buffer all packets it receives from the source and transmit them toward the destination when the connection resumes. As the source continues to retransmit earlier unacknowledged packets, congestion grows at the intermediate location.

When the connection is again available, the intermediary will have to transmit not only the original packets, but all of the retransmitted versions of the packets, even though they will be ignored when received at the destination.

Even if the source or destination endstation terminates the TCP connection (e.g., with a FIN packet), that termination will follow and be processed in sequence with all other buffered packets. When the link resumes, all the preceding packets in the connection (e.g., original packets and retransmissions) will still be transmitted before the termination is passed on.

SUMMARY

In some embodiments of the invention, apparatus and methods are provided for optimizing communications at an intermittent communication link. In these embodiments, the link is serviced by a communications processor that is not an endstation (i.e., source or destination) of the optimized communications. When the link is inoperative, communications (e.g., packets, frames, cells) are queued for transmission by the processor, and transmission will resume when the link resumes operation.

In methods of the invention, the communications processor examines communications to identify those that may be discarded without significantly affecting their communication connections. If already queued for transmission, identified communications may be dropped from the queue or may be marked for discard when removed for transmission. If not already queued, they may be discarded.

In some methods, in which a communication received at the communications processor for transmission has an associated deadline or lifetime, the processor will compare that deadline with the communication's current age. This comparison may be done while the communication is in queue or after the link is again operable and the communication is retrieved from the queue for service.

In some methods, the communications processor recognizes a termination notice for a communication connection, which may be a FIN packet for a TCP (Transport Control Protocol) connection, for example. After a termination notice is received, the processor may discard (or mark for discard) earlier packets in the same connection, especially data packets.

A termination notice may be received as outgoing traffic (e.g., from an application processor that is served by the communications processor) or incoming traffic (e.g., for delivery to an application processor that is served by the communications processor). Regardless of the direction of the termination notification, data packets of the same connection sent in either direction prior to the notification have now become obsolete and may be dropped.

In some methods of the invention, while the communication link is inoperable, the communications processor receives retransmitted packets from an application processor or other local endstation of the communications. The communications processor may drop retransmitted packets and send only the original packets, or may send only a retransmitted packet and drop earlier ones.

In some embodiments of the invention, the communications processor may modify a communication, such as an IP (Internet Protocol) packet. For example, upon receipt of a termination notice, the processor may modify an earlier packet that is currently awaiting transfer or transmission from the processor, to set a corresponding flag (e.g., the FIN flag). In this example, the processor could then discard some or all subsequent packets of that connection.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for optimizing communications at an intermediate point between source and destination endstations of a communication connection. In these embodiments, the intermediary is a station that exchanges communications (e.g., packets) over a communication link that is susceptible to temporary interruption or outage, and optimization may help avoid or alleviate congestion. This link may be a wireless or a wired link.

Specific implementations of embodiments of the invention are described herein as they may be applied in a communication environment in which one endstation (e.g., the source of a communication connection) is an application or application processor executing on a wireless communication device (e.g., a smart phone, a table computer) and the other endstation (e.g., the destination) is an application server, a web server or some other server application or server computer system. The intermediary may be a baseband communication processor of the communication device. From the following discussion, other implementations of embodiments of the invention described herein may be readily developed by those of ordinary skill in the art without exceeding the scope of the present invention.

Figure 1:
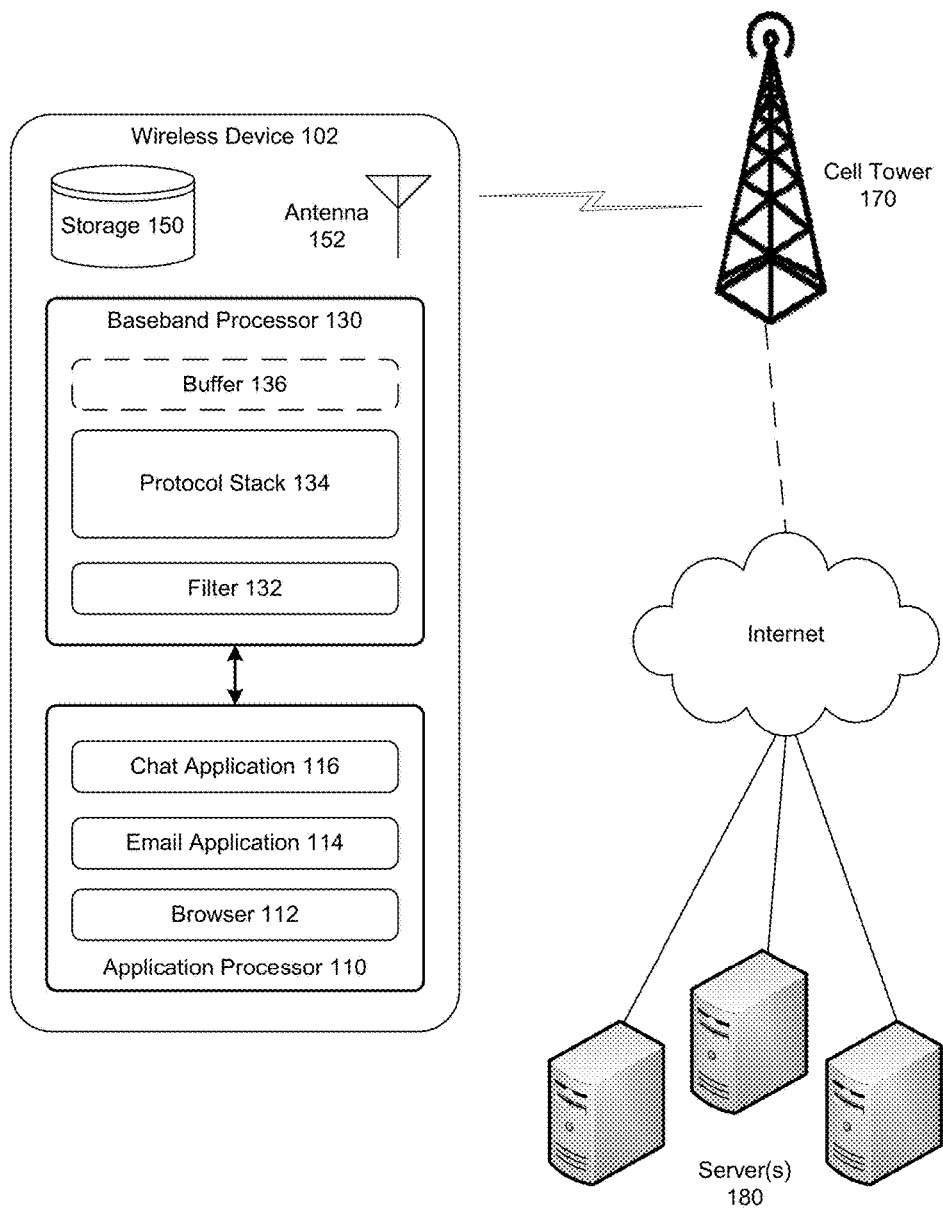
FIG. 1 is a block diagram of apparatus for optimizing communications at an intermittent communication link, according to some embodiments of the invention.

FIG. 1 is a block diagram of apparatus for optimizing communications at or near an intermittent communication link, according to some embodiments of the invention.

Wireless device 102 is configured to provide voice and data communications for an operator of the device, via a wireless link to a telephone service provider's cell tower or eNodeB 170. Through an evolved packet core (EPC) or other service network, the telephone service provider offers the device operator access to the Internet and/or other networks. Therefore, using a wireless communication connection offered by the telephone service provider, device 102 may establish data connections with servers 180. A given server 180 may be a web server, a data server, an application server or some other server; different servers may be operated by different organizations.

For purposes of describing some embodiments of the invention, wireless device 102 includes application processor 110, baseband processor 130, storage 150 and antenna 152. Other components of wireless device 102 are omitted in the interest of clarity (e.g., power amplifier, Wi-Fi® module, Bluetooth® module, input controls).

Application processor 110 hosts any number of applications at the same time or different times, such as browser 112, email application 114, chat application 116 and/or others. Each application executed by application processor 110 may open one or more data connections (e.g., TCP or Transport Control Protocol connections) with a server application executing on a server 180 or some other destination. Application software and other program code and data are stored in storage 150 and/or other components (e.g., firmware, memory).

In the illustrated apparatus, one or more of the applications interact with their server counterparts using communications formatted according to IP (Internet Protocol) and TCP or UDP (User Datagram Protocol). Other embodiments of the invention may be readily configured for operation with other communication protocols.

In the illustrated method of the invention, the communication link between device 102 and cell tower 170 is a wireless link using CDMA (Code Division Multiple Access), wideband CDMA, GSM (Global System for Mobile Communications), LTE (Long Term Evolution) or some other communication protocol compatible with a telephone service provider's network, but in other embodiments of the invention the link may be a wired/optical link or a satellite link that is intermittent or that is occasionally inoperative. Cell tower 170 may, alternatively, be an access point or other entity that provides access to the Internet.

Baseband processor 130 of wireless device 102 comprises filter 132 for optimizing communications, protocol stack 134 for processing the communications according to operative communication protocols, and optional buffer 136. Packets awaiting transmission from baseband processor 130 (e.g., via antenna 152), and/or communications received at the device from external sources (e.g., via antenna 152) may be stored in buffer 136. In other embodiments of the invention, buffer 136 may be part of storage 150, application processor 110 or some other component of wireless device 102.

Protocol stack 134 includes logic for processing incoming and outgoing communications according to applicable protocols, and therefore may assemble and/or disassemble packets, frames, datagrams and/or other communication units. Any suitable protocol for internal and external communications may be implemented in protocol stack 134. In some alternative embodiments of the invention, filter 132 may be implemented within the protocol stack.

Because application processor 110 may be unaware when a wireless link between device 102 and cell tower 170 is interrupted, and therefore cannot intelligently control its transmission and/or retransmission of packets, filter 132 applies intelligence to discard outgoing and/or incoming packets in order to eliminate some or all packets that need not be forwarded. The filter may do so by removing packets or packet data from buffer 136 (and/or other locations), by marking such packets or packet data so that they will be dropped or discarded, modifying packets or packet data, or by taking other action.

In some embodiments of the invention, filter 132 examines address information of packets transiting the baseband processor, in order to determine which communication connection they belong to. In some implementations the filter considers the source and destination IP addresses and the source and destination TCP port numbers; packets having the same set of addresses and port numbers may be assumed to be part of the same communication connection.

Optimizations performed by filter 132 may serve to discard packets that are awaiting transmission from the wireless device, but which become obsolete for some reason. In some embodiments, outgoing packets awaiting transmission may become obsolete if the source of the packets (e.g., application processor 110 or an application) closes the packets' communication connection, such as by issuing a FIN packet.

Upon receipt of the termination notice (e.g., the FIN packet), filter 132 will eject from buffer 136 earlier data packets it finds that belong to the connection being terminated, or mark them so that when removed from the queue for transmission they are discarded without being transmitted. The FIN packet, or other notification of termination, and possibly other control packets, will be retained and transmitted toward its destination when the communication link is re-established.

A similar optimization may be applied when the communication link is re-established and filter 132 receives notification from the destination station (e.g., on server 180) of termination of a communication connection. In this case, the filter will determine whether any data packets are awaiting transmission toward the destination for that same connection. If so, they will be discarded from the buffer or marked in a way to prevent them from being transmitted.

In some implementations, when the filter detects a FIN packet (or other termination notification), in addition to discarding packets queued for transmission from wireless device 102, it may discard incoming packets of the same connection that are bound for application processor 110. Control packets that affect or acknowledge termination of the connection may be forwarded, in particular an incoming termination notification, but others (e.g., data packets) will not.

In some embodiments of the invention, filter 132 may proactively discard original packets that have been retransmitted, and/or retransmissions of original packets, even without receipt of a FIN packet or other notification of termination of the packets' connection. For example, when queuing a retransmitted packet received from application processor 110, the filter may determine that it may now discard the original packet and/or any earlier retransmissions that are in queue. Conversely, a retransmitted packet may be dropped and its original packet retained.

Another optimization that a filter may perform applies to time-sensitive communications. For example, application processor 110 (or an application executing on the application processor) may apply deadlines or lifetimes to UDP packets or other communication units it issues for a particular communication connection.

When a wireless communication link is re-established after an outage, and packets for that connection are waiting to be transmitted, the filter may examine their age and discard any that are past their deadlines or lifetimes. In making this calculation, the filter may consider a measure of the expected amount of time required for a packet to be delivered to its destination after being transmitted from device 102, and add that time to its current age before determining whether to discard it. In some implementations, the baseband processor does not wait until the communication link is re-established before dropping packets that have expired or that will expire soon.

In embodiments of the invention reflected in FIG. 1, application processor 110 and baseband processor 130 may be single-chip or multiple-chip modules, and may communicate via USB (Universal Serial Bus), UART (Universal Asynchronous Receiver-Transmitter) or some other protocol or communication framework.

Embodiments of the invention described herein as applied to baseband communications may also be applied to other communication technologies such as Wi-Fi or Bluetooth and virtually any other technology in which a communication connection may be intermittent and in which a non-endstation intermediary is responsible for transmitting across that connection.

Figure 2:
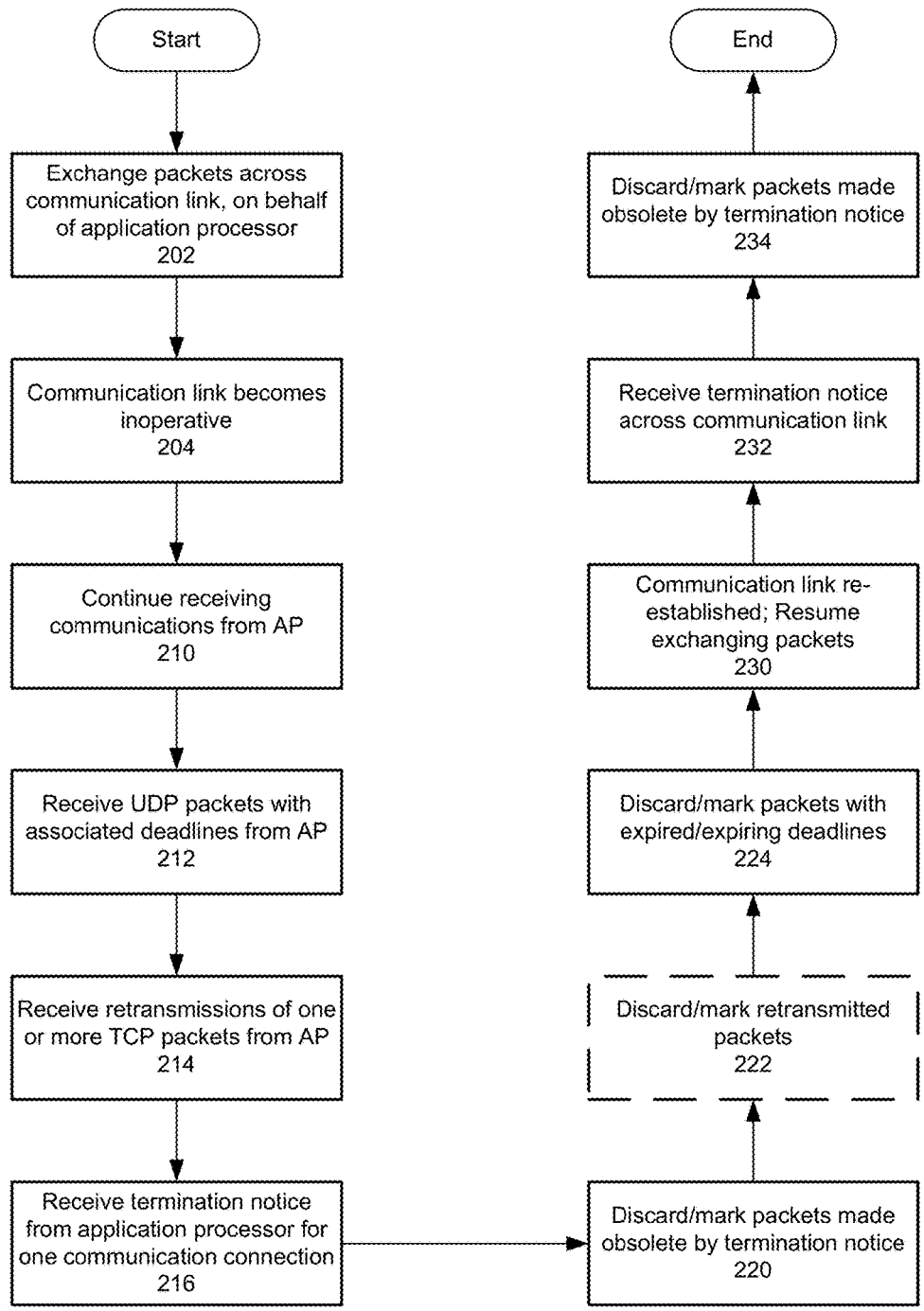
FIG. 2 is a flowchart illustrating one method of optimizing communications at an intermittent communication link, in accordance with some embodiments of the invention.

FIG. 2 is a flowchart demonstrating a method of optimizing communications at an intermittent communication link, according to some embodiments of the invention. In these embodiments, a baseband processor manages the exchange of communications (e.g., packets, frames) across the communication link, on behalf of an application processor that is the source or destination endstation of communication connections transiting the link (or that executes applications that are source or destination endstations).

Although multiple optimizations are reflected in the method of FIG. 2, in other methods a single optimization or a different combination of optimizations may be employed.

In operation 202, the baseband processor exchanges packets across the communication link on behalf of the application processor, for any number of communication connections. At the other end of the link may be an eNodeB or cellular tower, an access point or some other entity.

In operation 204, the communication link becomes inoperative. The outage may be caused by an equipment failure, weather, some other environmental factor, or may be interrupted by some other cause.

In operation 210, the application processor (or AP) is not aware of the outage, and therefore continues to issue to the baseband processor communications, including TCP packets, for transmission across the communication link. Because the link is out, the communications are buffered at the baseband processor or some associated component.

In operation 212, the baseband processor receives one or more communications (e.g., UDP packets) having associated deadlines, lifetimes or times to live.

In operation 214, the baseband processor receives from the AP one or more retransmissions of TCP packets or other communications it previously issued. Illustratively, the retransmissions may start occurring when a retransmit timer times out and the AP has not received an acknowledgement for a corresponding communication. The retransmissions may be for communications that were transmitted across the link before the outage, and/or for communications currently awaiting transmission from the baseband processor.

In operation 216, the baseband processor receives a termination notice (e.g., a TCP FIN packet) from the AP for a particular connection. The application processor may or may not have previously retransmitted earlier packets of the connection (e.g., in operation 214).

In operation 220, the baseband processor discards, or marks for discard, communications (e.g., TCP packets) made obsolete by the termination notice. Obsolete communications may include data packets held in queue, as well as any retransmissions of those data packets. The termination notice will be retained and will be transmitted across the communication link when it is re-established.

Other control packets in the connection being terminated may be discarded or marked for discard, depending on their effect. Or, a default rule may apply to retain (or discard) such control packets.

In optional operation 222, some or all retransmitted packets for which no FIN or termination has been received may be discarded or marked for discard. Discarded/marked packets may illustratively include all but the most recent version of an original packet, may include all but the original packet, or may involve some other collection of packets.

Operation 222 (and/or other optimization operations) may be periodically repeated while the communication link is inoperative. Thus, implementation of an embodiment of the invention is not limited to a one-time serial application of individual optimizations. For example, an optimization such as operation 222 may also be performed after the communication link is re-established, in order to eliminate additional obsolete communications if possible.

In operation 224, the baseband processor determines whether any communications (e.g., UDP packets) that have associated deadlines have reached those deadlines. It may also identify any communications that cannot reach their destinations before expiration of their deadlines. Identified communications are discarded or marked for discard.

In operation 230, the communication link is re-established, and queued communications resume processing for transmission. If communications were merely marked for discard (e.g., rather than being extracted from the queue), then the baseband processor, a component of the transceiver, or some other element checks the communications for marks signifying that they should be dropped, and only transmits those that are not marked.

In operation 232, a termination notice is received across the communication link for a communication connection, which may or may not be the same as the communication connection referenced in operation 216.

In operation 234, communications made obsolete by the termination notice of operation 232 are discarded or marked for discard. These communications may include outgoing data packets that were queued at the baseband processor during the link outage.

It may be noted that some optimization operations may continue for a period of time. For example, regarding the termination notice of operation 216, incoming data packets received across the communication link for the same communication connection may be dropped because the application processor has terminated the connection. Similarly, for the connection referenced in operation 232, outgoing data packets may be dropped until the connection is reset or cleared out.

Yet further, the baseband processor may examine deadlines or lifetimes of some inbound communications received across the communication link after it is re-established, and drop some or all that have expired.

After operation 234, the illustrated method of the invention ends.

In addition to, or instead of the optimizations described above, in some embodiments of the invention the baseband processor may modify a communication that is awaiting transfer or transmission from the processor. The communication may currently be buffered or queued, and may be outbound (i.e., awaiting transmission toward a destination station) or inbound (i.e., awaiting transfer to an associated application processor).

As one example, upon receipt of a termination notice (e.g., a TCP FIN packet) for a particular communication connection, the processor may modify an earlier packet of that connection to set a particular flag (e.g., the FIN flag). In this example, the processor could then discard subsequent packets of the same connection.

Alternatively, the baseband processor could inject a new packet into the connection, at or near the front of the transfer/transmission queue for example, to accomplish the same outcome, or move the termination notice up in the queue with any suitable modifications (e.g., to TCP sequence number).

The environment in which some embodiments of the invention are executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of communicating using a wireless communication link, the method comprising:
   at a communications processor, queuing multiple data packets for transmission across the wireless communication link, the wireless communication link being temporarily inoperative, wherein the communications processor is not an application processor of a communication connection to which the multiple data packets belong;
   receiving a notification of termination packet of a first communication connection from the application processor coupled to the communications processor before the wireless communication link resumes operating, wherein at least one data packet of the multiple data packets queued is associated with the first communication connection;
   based at least in part on the notification of termination packet of the first communication connection received, selecting the at least one data packet for discard; and
   after the wireless communication link resumes operating, transmitting by the communications processor, the notification of termination packet of the first communication connection across the wireless communication link, but not transmitting the at least one data packet selected.

2. The method of claim 1, further comprising:
   before the wireless communication link resumes operating, receiving a set of data packets, wherein each data packet has an associated deadline;
   selecting for discard a subset of the set of data packets for which associated deadlines have expired; and
   after the wireless communication link resumes operating, forwarding the set of data packets except the selected subset.

3. The method of claim 2, further comprising:
   selecting for discard a second subset of the set of data packets for which associated deadlines are predicted to expire before the second subset is delivered to corresponding destinations.

4. The method of claim 1, wherein the communications processor is not a source or a destination of the communication connection.

5. The method of claim 1, further comprising:
   before the wireless communication link resumes operating, receiving a second notification of termination packet of a second communication connection associated with a second data packet of the multiple data packets queued.

6. The method of claim 1, wherein the notification of termination packet of the first communication connection is a FIN packet.

7. The method of claim 1, wherein the selecting the at least one data packet for discard comprises:
   matching addresses and ports of a source and destination of the notification of termination packet with addresses and ports of a source and destination of the at least one data packet.

8. The method of claim 1, wherein the selecting the at least one data packet for discard comprises marking the at least one data packet for discard.

9. The method of claim 1, wherein the selecting the at least one data packet for discard comprises discarding the at least one data packet.

10. A non-transitory computer-readable medium having instructions stored therein, which when executed by a processor, cause the processor to perform operations, the operations comprising:
   at a communications processor, queuing multiple data packets for transmission across a wireless communication link, the wireless communication link being temporarily inoperative, wherein the communications processor is not an application processor of a communication connection to which the multiple data packets belong;
   receiving a notification of termination packet of a first communication connection from the application processor before the wireless communication link resumes operating, wherein at least two data packets of the multiple data packets queued are associated with the first communication connection;
   based at least in part on receiving the notification of termination packet of the first communication connection, setting a FIN flag of an earlier data packet of the at least two data packets of the multiple data packets queued;
   discarding a remaining data packet of the at least two data packets; and
   after the wireless communication link resumes operating, transmitting by the communications processor, the earlier data packet with the FIN flag across the wireless communication link.

11. A method of communicating using a wireless communication link, the method comprising:
   at a communications processor, queuing multiple data packets for transmission across the wireless communication link, the wireless communication link being temporarily inoperative, wherein the communications processor is not a source or a destination of a communication connection to which the multiple data packets belong, and wherein the multiple data packets queued comprise a retransmission of a first data packet;
   while the wireless communication link is temporarily inoperative, marking the retransmission of the first data packet for discard;
   based at least in part on the marking, removing the retransmission of the first data packet from the multiple data packets queued, wherein the first data packet is an original data packet; and
   after the removing and before the wireless communication link resumes operating, receiving a notification of termination packet of the communication connection from an application processor coupled to the communications processor.

12. An apparatus that communicates using a wireless communication link, the apparatus comprising:
   an application processor terminating one or more communication connections that traverse the wireless communication link;
   a baseband processor coupled to the application processor, configured to transmit and receive communications across the wireless communication link, wherein the wireless communication link is temporarily inoperative, wherein the baseband processor is not an end station of a communication connection of the one or more communication connections, and is configured to:
      queue a data packet among multiple data packets queued, the data packet being associated with a communication connection among the one or more communication connections;
      receive a notification of termination packet of the communication connection from the application processor before the wireless communication link resumes operating;
      move the notification of termination packet of the communication connection to the queue of the multiple data packets queued, earlier than the data packet of the multiple data packets queued by modifying a Transport Control Protocol (TCP) sequence number of the notification of termination packet of the communication connection;
      mark the data packet of the multiple data packets queued as an obsolete communication; and
      based at least on the mark, identify one or more obsolete communications including the obsolete communication; and
   a filter configured to select for discard the one or more obsolete communications.

13. The apparatus of claim 12, wherein the one or more obsolete communications include a second data packet of the multiple data packets queued, the second data packet being associated with a second communication connection, and wherein the second data packet has an associated deadline that expires before the wireless communication link is operative.

14. The apparatus of claim 12, wherein the one or more obsolete communications include a second data packet of the multiple data packets queued that has been retransmitted by the application processor while the wireless communication link is temporarily inoperative.

15. The apparatus of claim 12, wherein the baseband processor is not a source or destination of the one or more communication connections.

16. The method of claim 1, while the wireless communication link being temporarily inoperative, wherein a second data packet of the multiple data packets queued is also associated with the notification of termination packet of the first communication connection, wherein the second data packet is queued before the at least one data packet:
   setting a FIN flag of the second data packet of the multiple data packets queued;
   determining that the wireless communication link resumes operating; and
   transmitting the second data packet with the FIN flag prior to transmitting the notification of termination packet of the first communication connection across the wireless communication link.

17. The method of claim 5, further comprising:
   based at least on the second notification of termination packet, injecting a new packet associated with the second communication connection, before the second data packet queued;
   after the wireless communication link resumes operating, transmitting the new packet across the wireless communication link; and
   discarding the second data packet and the second notification of termination packet.

18. The method of claim 17, wherein the injecting the new packet comprises selecting a Transport Control Protocol (TCP) sequence number in relation to a TCP sequence number of the second data packet.

19. The method of claim 11, further comprising:
   based at least on the notification of termination packet, injecting a new packet associated with the communication connection, before a second data packet queued, wherein the second data packet is associated with the communication connection;

after the wireless communication link resumes operating, transmitting the new packet across the wireless communication link; and discarding the notification of termination packet and the second data packet.

20. The method of claim 19, wherein the injecting the new packet comprises selecting a Transport Control Protocol (TCP) sequence number in relation to a TCP sequence number of the second data packet.

* * * * *